(12) United States Patent
Maceri et al.

(10) Patent No.: US 7,140,658 B2
(45) Date of Patent: Nov. 28, 2006

(54) STORAGE AND TREAD UNIT

(75) Inventors: Alexander J Maceri, Sterling Heights, MI (US); Scott B Perry, Riverview, MI (US); Eberhard Krueger, Jr., Lake Orion, MI (US); Mark A Rice, Garden City, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 95 days.

(21) Appl. No.: 10/888,038

(22) Filed: Jul. 9, 2004

(65) Prior Publication Data
US 2006/0006684 A1     Jan. 12, 2006

(51) Int. Cl.
*B60N 2/04* (2006.01)

(52) U.S. Cl. .............................. 296/37.15; 296/37.14; 296/65.09; 297/188.09

(58) Field of Classification Search ............. 296/37.15, 296/37.14, 37.16, 75, 37.8, 65.01, 65.09; 224/275; 297/188.09, 15, 326, 335, 188.1
See application file for complete search history.

(56) References Cited

U.S. PATENT DOCUMENTS 3,058,771 A * 10/1962 Hill et al. ................. 296/37.15
6,488,327 B1 * 12/2002 Pearse et al. ............ 296/65.05

* cited by examiner

*Primary Examiner*—Stephen Gordon
(74) *Attorney, Agent, or Firm*—Ralph E. Smith

(57) ABSTRACT

A combination storage and tread unit has a housing which is installed beneath a second row of seating in an automotive vehicle body. The housing has a tread pad at each end which a person can step on to reach a third row of seating when a seat in the second row is tumbled forwardly. The housing has two module-receiving compartments for storing electrical control modules and related wiring. The compartments are covered and protected by the second row of seating when the seats in the second row are in a normal occupant-supporting position, but are readily accessible when the seats are tumbled forwardly, so that the modules may be removed and serviced without removing the seats.

1 Claim, 4 Drawing Sheets

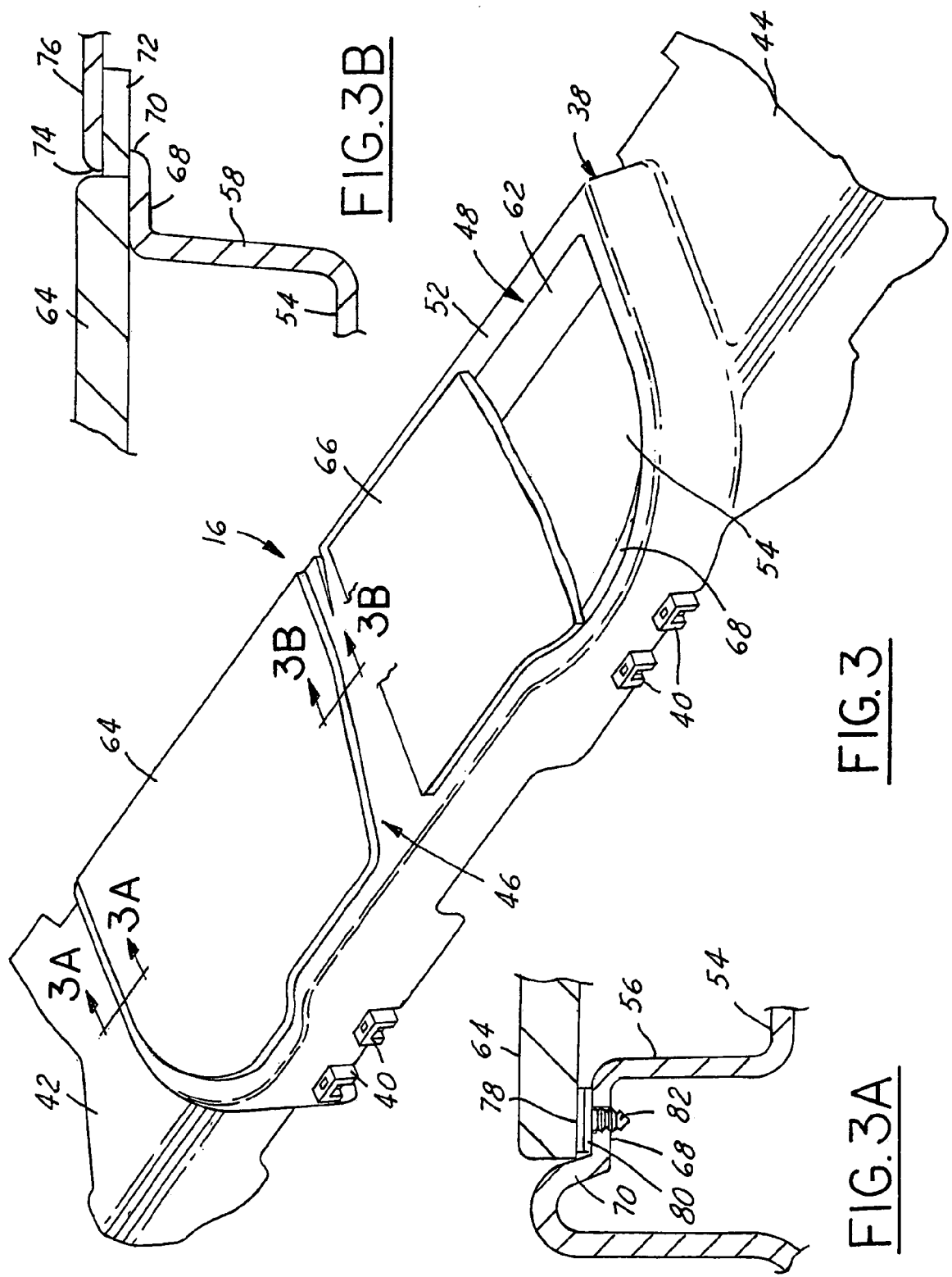

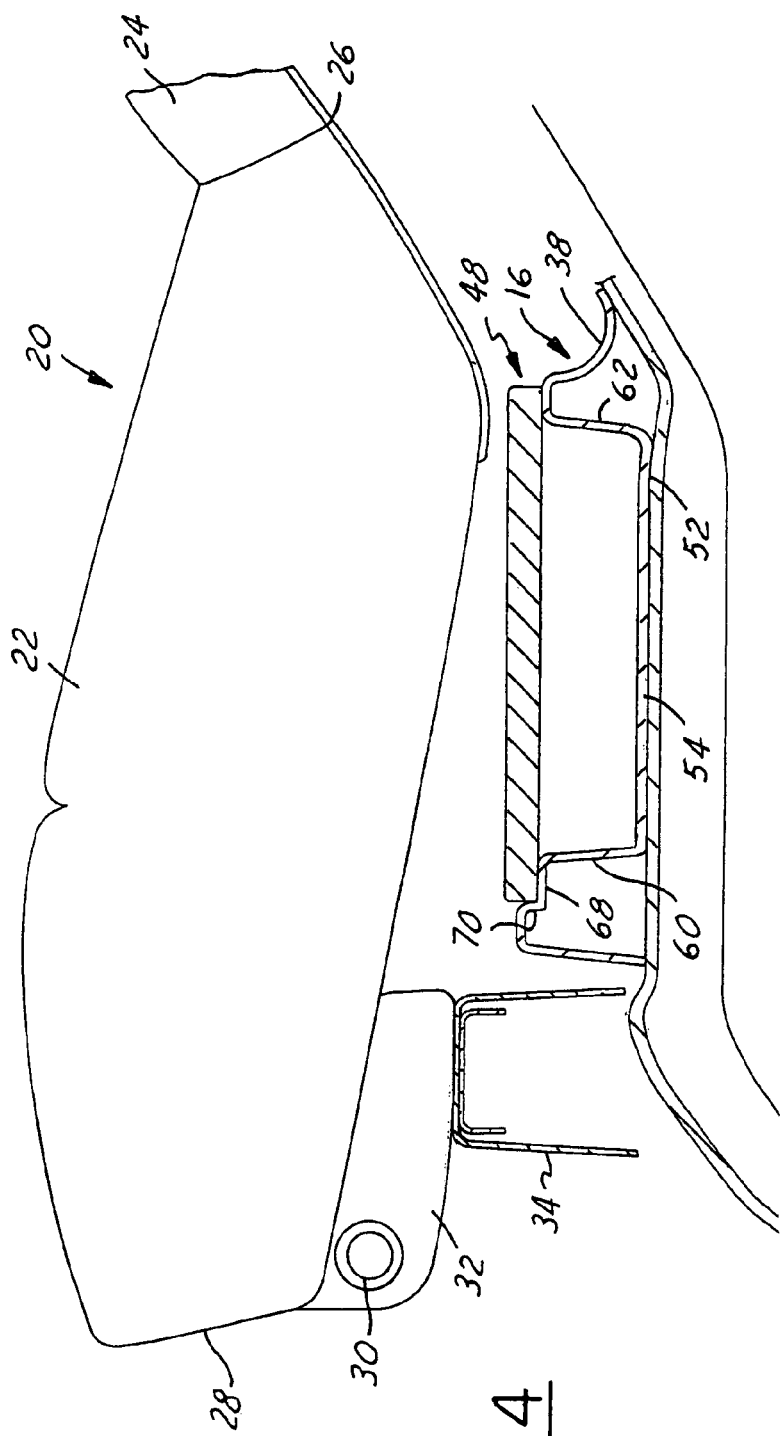
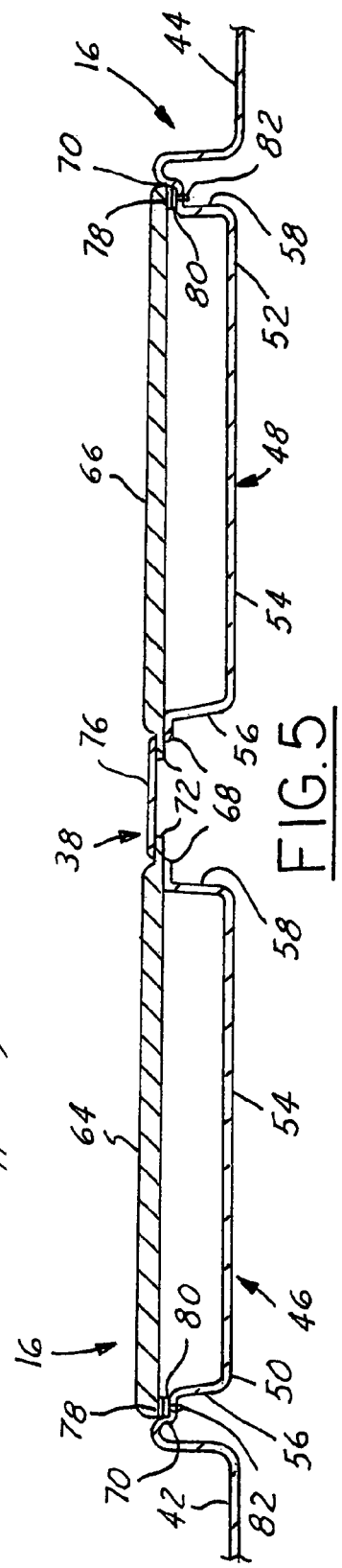

STORAGE AND TREAD UNIT

FIELD OF THE INVENTION

This invention relates to a combination storage and tread unit for an automotive vehicle, and more particularly to such a unit placed under seating in an automotive vehicle body.

BACKGROUND OF THE INVENTION

In modern vehicles, there sometimes is the problem of finding a space for storing electrical control modules and related wiring in an area which is protected yet readily accessible. There can also be the problem of providing a convenient step for gaining entry to an area of the vehicle behind the seating, usually behind the second row of seating.

SUMMARY OF THE INVENTION

In accordance with the present invention, a combination storage and tread unit is provided which comprises a housing that is installed beneath certain seating, usually the seats in a second row of seating. The housing has at least one, and preferably two, module-receiving compartments. The housing also has a tread pad at each end which a person can step on to reach a third row of seating when a seat in the second row is pivoted or tumbled forwardly.

The compartments are protected when the seats in the second row are in a normal occupant-supporting position. However, when the seats in the second row are tumbled forwardly, the module-receiving compartments are readily accessible so that the modules may be removed from the compartments and serviced without removing the seats.

Preferably each of the compartments comprises a downwardly dished, pan-shaped module holder, and a cover for each of the module-holders. It is also preferred that the module holders and tread pads be integral portions of the housing. The covers are readily removable.

The combination storage and tread unit is of one piece design, and therefore easier to install and requiring less labor than separate storage and tread components. The storage compartments protect against electrical failures and shocks as may be caused by liquid spills, for example.

One object of this invention is to provide a combination storage and tread unit having the foregoing features and capabilities.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a perspective view of the combination storage and tread unit;

FIG. 3A is a fragmentary sectional view taken in the line 3A—3A in FIG. 3;

FIG. 3B is a fragmentary sectional view taken on the line 3B—3B in FIG. 3;

FIG. 4 is a fragmentary side view of one of the seats of the second row of seating in a normal occupant-supporting position, showing the combination storage and tread unit in section beneath the seat; and FIG. 5 is a longitudinal sectional view of the combination storage and tread unit.

DETAILED DESCRIPTION OF THE PREFERRED EMBODIMENTS

Figure 1:
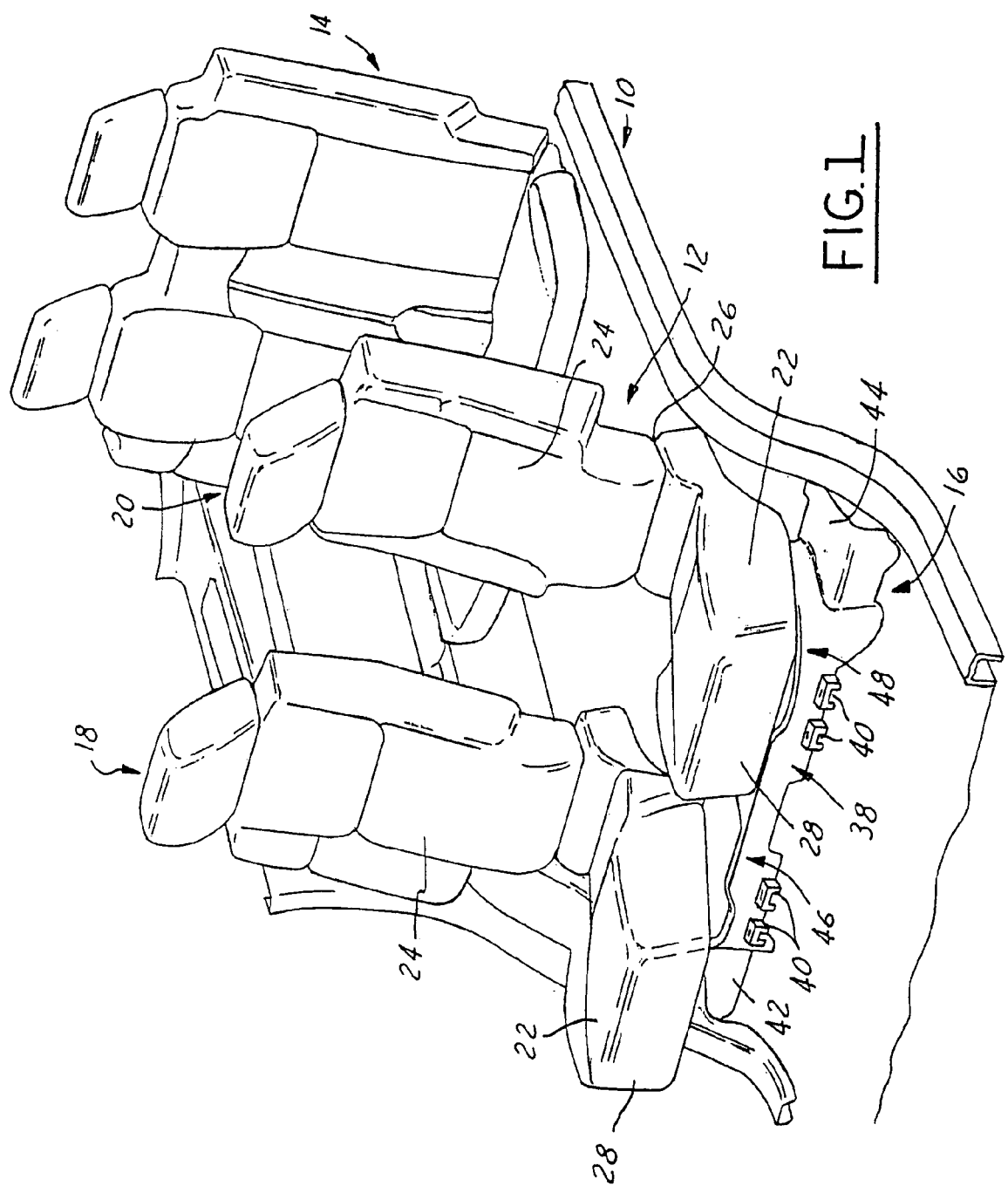
FIG. 1 is a fragmentary perspective view of the inside of an automotive vehicle, showing the second and third rows of seating and a combination storage and tread unit constructed in accordance with the invention.

The following description of the preferred embodiment is merely exemplary in nature and is in no way intended to limit the invention, its application or its uses.

Referring now more particularly to the drawings, there is shown an automotive vehicle 10. There are three rows of seating. The first, or front row of seating is not shown, but a second row of seating 12 is behind the first row, a third row of seating 14 is behind the second row, and the combination storage and tread unit 16 of this invention is beneath the second row.

The second row of seating 12 comprises a pair of second row seats 18 and 20. The seats 18 and 20 are laterally spaced apart, and each seat has a seat bottom 22 and a seat back 24. The lower edge portion of the seat back 24 of each of the seats 18 and 20 is hinged at 26 to the rear edge portion of the seat bottom 22. The front edge portion 28 of the seat bottom 22 of each of the seats 18 and 20 is hinged at 30 to a bracket 32 mounted on a cross bar 34 secured to the floor of the vehicle. The bracket 32 and cross bar 34 are omitted in FIG. 1 to better illustrate the storage and tread unit 16.

Figure 2:
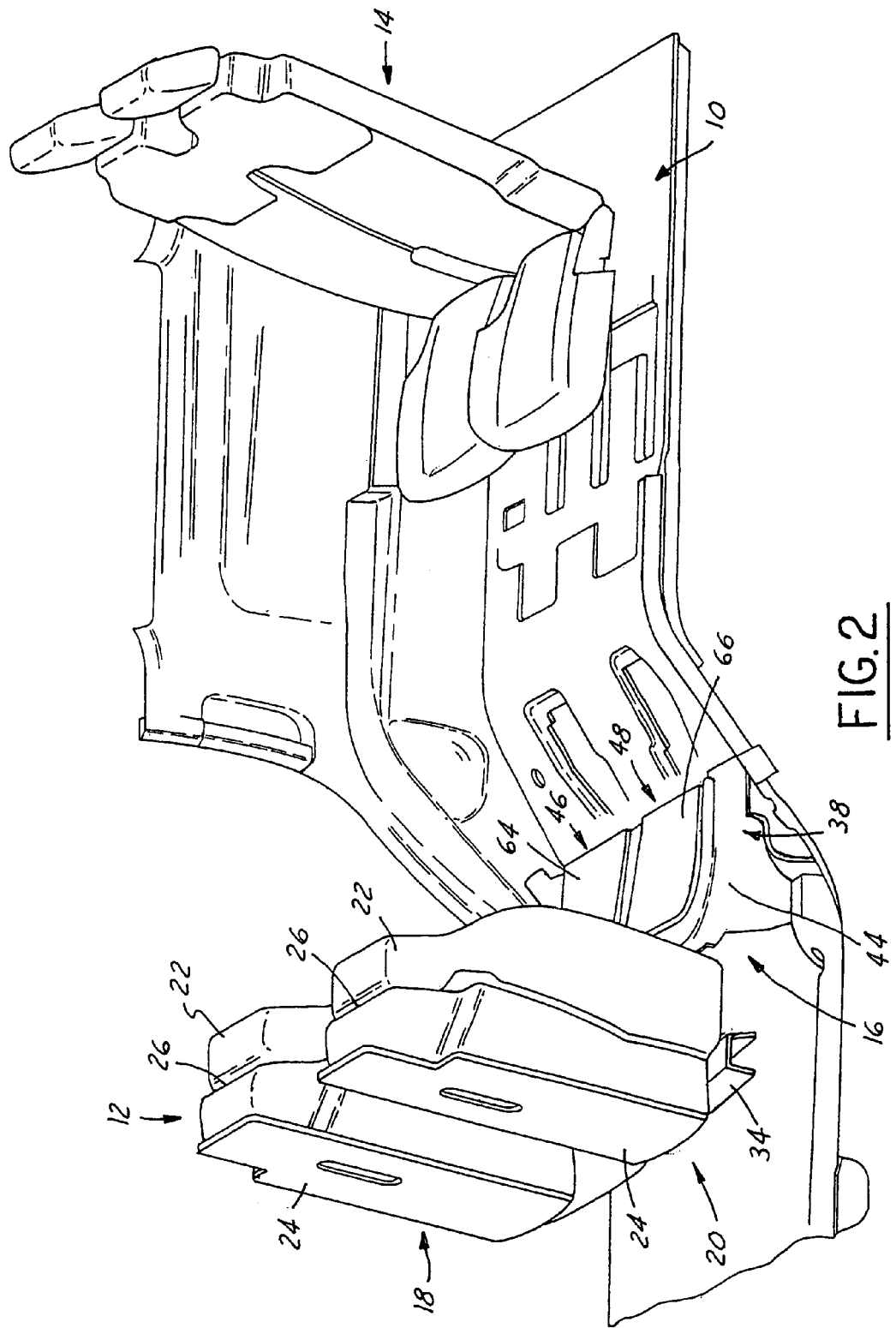
FIG. 2 is a fragmentary perspective view similar to FIG. 1, but showing the seats in the second row of seating tumbled forwardly.

The seat back 24 of each of the seats 18 and 20 may be folded forwardly over the seat bottom 22. The seat bottom together with the folded over seat back may be tumbled forwardly as shown in FIG. 2, making it easy for a person to move into the area behind the second row of seating and take a seat in the third row. When both of the seats 18 and 20 are tumbled forwardly, the combination storage and tread unit 16 is exposed and readily accessible. FIG. 1 shows the seats 18 and 20 in a normal, occupant-supporting position.

The combination storage and tread unit 16 comprises an elongated housing 38 which extends transversely of the vehicle and is beneath seats 18 and 20 of the second row seating when the latter are in the normal occupant-supporting position shown in FIG. 1. The housing 38 is secured to the floor of the vehicle by brackets 40.

The housing 38 has a tread pad 42 at one end and a tread pad 44 at the opposite end. Between the tread pads 42 and 44, the housing 38 has two module-receiving compartments 46 and 48 which are spaced from one another lengthwise of the housing.

Referring to FIGS. 3–5, each of the compartments 46 and 48 has a downwardly-dished, pan-shaped, open-topped module holder, one of which is identified by the reference 50 and the other by the reference 52. Each module holder has a flat, generally horizontal bottom wall 54, generally upwardly extending side walls 56 and 58 and generally upwardly extending front and rear walls 60 and 62. A cover 64 extends over the module-holder 50 and a cover 66 extends over the module-holder 52. The covers 64 and 66 completely close the respective module-holders. Surrounding the upper edge portions of the side walls 56 and 58 and the front and rear walls 60 and 62 of each of the module holders 50 and 52 is a continuous, laterally outwardly extending, generally horizontal ledge 68 to support the side, front and rear edges of the associated cover. Extending upwardly from the ledge 68 along the front and sides of each of the covers are upwardly extending abutment walls 70 to prevent lateral shifting of the covers. The covers may be completely separable from the housing 38 to permit access to the compartments.

Preferably, each cover 64, 66 has a tab 72 which is slidably insertable through a slot 74 in the wall 70 at one side of the cover and extends under the flat surface 76 of the housing separating the two compartments 46 and 48. Each cover has a strip 78 of a releasable locking material adjacent its outer edge which is engageable with a second releasable locking strip 80 on the ledge 68. The locking strip 78 may be secured to the cover as by a suitable adhesive. The locking strip 80 may be secured to the ledge 68 by a suitably adhesive or, as shown in FIG. 3A, by a fastener 82 extending through a hole in the ledge. The locking strips 78 and 80 may be of the hook and loop type sometimes referred to as Velcro, for example, and, when pressed together, releasably hold the covers 64 and 66 in place over the respective module holders 50 and 52. Each cover is removable by lifting its outer edge to separate the locking strips 78 and 80 and then sliding the cover laterally outwardly to disengage the tab 72 from the slot 74.

The module-holders 50 and 52 and the tread pads 42 and 44 are integral parts of, and formed of one-piece with, the housing 38.

The housing 38 may be formed of any suitable relatively rigid material, such, for example, as a glass-filled polypropylene. The covers 64 and 66 may be made of a polypropylene composite, for example.

In use, electrical control modules and related wiring are adapted to be stored in the compartments 46 and 48 Where they are protected and completely out of the way when the seats 18 and 20 are in the occupant-supporting position. However, the compartments 46 and 48 are readily accessible by folding the seat backs 24 forwardly over the seat bottoms 22 of the seats 18 and 20 in the second row of seating 12, and tumbling the seats 18 and 20 forwardly as in FIG. 2. Therefore, the covers 64 and 66 can be removed from the compartments 46 and 48, permitting the modules to be removed from the compartments and serviced without having to remove the seats. Either one of the tread pads 42, 44 may be used as a step to reach the third row of seating 14 when a seat of the second row is tumbled forwardly. Also, when a seat of the second row is tumbled forwardly, the cover of the adjacent compartment may be used as a step.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. In combination:
   a row of seating including laterally spaced seats in an automotive vehicle body;
   each of said seats being pivotally mounted in the vehicle body for movement from a normal, occupant-supporting position to a forwardly tumbled position facilitating access to an area in the vehicle body behind the row of seating;
   a combination storage and tread unit comprising an elongated housing mounted in the vehicle body beneath the seats when the seats are in the normal occupant-support position, said housing having a tread pad at opposite ends of said housing to serve as a step by a person when the person moves into the area behind the row of seating;
   said housing further having at least one module-receiving compartment between said tread pads, said compartment being protected by said seating when the seats are in the occupant-supporting position but being readily accessible when said seats are in the forwardly tumble position;
   wherein said tread pads and said module holders are integral parts of, and of one piece with, said housing, said housing further having a second module-receiving compartment between said tread pads, said compartments being spaced apart lengthwise of said housing;
   each of said compartments comprising a downwardly dished, pan-shaped module holder, each of said module holders further including a removable cover to close each of said compartments;
   each of said module holders having a flat, generally horizontal bottom wall, generally upwardly extending side, front and rear walls, and a continuous, laterally outwardly extending, generally horizontal ledge along upper edge portions of the side, front and rear walls supporting side, front and rear edge portions of the associated cover; and
   further including abutment walls along at least a portion of each of said ledges to oppose lateral shifting of said covers, wherein each of said covers has a tab adjacent one edge slidably engageable in a slot in said housing, and each of said covers has a locking strip spaced from said tab and releasably with a second locking strip on said housing.

* * * * *